(12) United States Patent
Okuda

(10) Patent No.: US 8,913,066 B2
(45) Date of Patent: Dec. 16, 2014

(54) CROSS-APPLICATION INFORMATION DISPLAY DEVICE, INFORMATION DISPLAY METHOD

(75) Inventor: Masato Okuda, Kyoto (JP)

(73) Assignee: Furuno Electric Co., Ltd., Nishinomiya (JP)

(*) Notice: Subject to any disclaimer, the term of this patent is extended or adjusted under 35 U.S.C. 154(b) by 139 days.

(21) Appl. No.: 13/452,700

(22) Filed: Apr. 20, 2012

(65) Prior Publication Data

US 2012/0274660 A1 Nov. 1, 2012

(30) Foreign Application Priority Data

Apr. 27, 2011 (JP) ................. 2011-099025

(51) Int. Cl.
*G06F 13/14* (2006.01)
*G06F 3/0482* (2013.01)
*G01S 7/04* (2006.01)

(52) U.S. Cl.
CPC ............... *G06F 3/0482* (2013.01); *G01S 7/04* (2013.01)
USPC .......................................... 345/520

(58) Field of Classification Search
USPC .......................................... 345/520
See application file for complete search history.

(56) References Cited

U.S. PATENT DOCUMENTS

| 5,920,316 A | 7/1999 | Oran et al. | |
|---|---|---|---|
| 2003/0169302 A1* | 9/2003 | Davidsson et al. | 345/810 |
| 2004/0233239 A1* | 11/2004 | Lahdesmaki | 345/810 |
| 2007/0130532 A1 | 6/2007 | Fuller et al. | |
| 2009/0096867 A1* | 4/2009 | Skjelten et al. | 348/113 |
| 2010/0064258 A1 | 3/2010 | Gorczowski et al. | |

FOREIGN PATENT DOCUMENTS

| DE | 10132956 A1 | 1/2003 |
|---|---|---|
| DE | 102007001317 A1 | 7/2008 |
| EP | 1521168 A2 | 4/2005 |
| JP | 05002065 | 1/1993 |
| JP | 08105954 | 4/1996 |
| JP | 10239419 | 9/1998 |
| JP | 10239419 A | 9/1998 |
| WO | 0065429 A1 | 11/2000 |
| WO | 0109707 A1 | 2/2001 |
| WO | 0201337 A1 | 1/2002 |

OTHER PUBLICATIONS

Machine-generated English translation of JP 10-239419, 2013, pp. 1-7.*
ISA European Patent Office, Extended European Search Report of EP12165217, Nov. 16, 2012, WIPO, 8 pages.

* cited by examiner

*Primary Examiner* — David Zarka
*Assistant Examiner* — Vu Nguyen
(74) *Attorney, Agent, or Firm* — Alleman Hall McCoy Russell & Tuttle LLP

(57) ABSTRACT

An information display device is provided. The information display device includes a controller for being able to execute a plurality of applications, a user interface for allowing a user to instruct the controller, and a display unit for simultaneously displaying an application selection menu item for allowing the user to select one of the applications and an application proprietary menu item that is used with a selected application, along with an information image created by execution of the selected application. The display unit is configured to display the information image, the application selection menu item, and the application proprietary menu at substantially the same position on a display screen of the display unit, regardless of which application is selected.

19 Claims, 7 Drawing Sheets

CROSS-APPLICATION INFORMATION DISPLAY DEVICE, INFORMATION DISPLAY METHOD

CROSS-REFERENCE TO RELATED APPLICATION(S)

The application claims priority under 35 U.S.C. §119 to Japanese Patent Application No. 2011-099025, which was filed on Apr. 27, 2011, the entire disclosure of which is hereby incorporated by reference.

TECHNICAL FIELD

The present invention relates to displaying information, where a plurality of applications can be executed and a display screen for an application can be switched to another display screen corresponding to another application.

BACKGROUND OF THE INVENTION

Conventionally, radar image display devices which create and display a radar image based on one or more echo signals received from a radar antenna has been known. In some of the radar image display devices, menu indications have been devised to display the radar image enlarged on a display screen. JP10-239419A discloses this kind of radar image display device, for example.

The radar image display device disclosed in JP10-239419A classifies various menu items into menu items for steady (i.e., static) information indications and menu items for non-steady (i.e., dynamic) information indications. The steady information includes information which must be displayed, for example by international standards, and information which a user always wants to observe (information on a ship position, a ship speed, a heading, etc.), and it is always displayed on a corner part of a display screen. Whereas, the non-steady information is displayed overlapping with a radar image when a predetermined operation is performed by a user. Thus, a radar image can be displayed enlarged, while maintaining operability to some extent.

As for other methods of displaying a radar image, JP05-002065A discloses a configuration where an azimuth scale is additionally displayed on a range ring (distance ring), and JP08-105954A discloses a configuration where ranges which are usually used can be selected by a user by displaying a list of available ranges (display distance range).

In recent years, an information display device has been proposed. This device receives data including positional information of a ship and school-of-fish information as well as echo signals, and executes an application according to the received data to display, for example, a radar image, an electronic nautical chart around the ship, and an image of the school-of-fish information. This kind of information display device can switch an image displayed on a display screen from one to another based on an instruction from the user.

However, since types and number of menu items required for each image displayed are different, the conventional information display devices described above typically display the menu items differently at different positions in the display screen for different images. Therefore, a user must study the display positions and the selection manners for every application, confusing the user when selecting a menu item.

SUMMARY OF THE INVENTION

The present invention is made in view of the above situation, and provides an information display device which can selectively display the display screen image of a plurality of applications to provide a unified operation between the applications.

According to one aspect of the invention, an information display device is provided, which includes a controller for being able to execute a plurality of applications, a user interface for allowing a user to instruct the controller, and a display unit for simultaneously displaying an application selection menu item for allowing the user to select one of the applications and an application proprietary menu item that is used with a selected application, along with an information image created by execution of the selected application. The display unit is configured to display the information image, the application selection menu item, and the application proprietary menu at substantially the same position on a display screen of the display unit, regardless of which application is selected.

Therefore, since the manner of display of the menu items is the same even if the application is switched, the user's operations can be unified between the applications.

A selection manner of the application selection menu item and a selection manner of the application proprietary menu item may be configured to be substantially the same, regardless of which application is selected.

Therefore, since not only the arrangement of the menu item but the selection manner (e.g., a method of displaying apparatuses and buttons used in the selection of the application, and a method of displaying lower layer menu items in a case where the entire menu item has hierarchy structures) can be made substantially the same between the applications, the user's operation can be more unified.

The application proprietary menu item may include a first menu item configured to be displayed along an edge of the display screen, and arranged at least one of vertically and horizontally. The application proprietary menu item may also include a second menu item associated with the first menu item, displayed along an edge of the display screen, and arranged at least one of vertically and horizontally.

Therefore, comparing with a menu configuration of a pull-down method where lower-layer menu items are displayed under the selected higher-layer menu item by selecting one of the higher-layer menu items arranged in an upper part of a display screen, viewability of the information image can be made better at the time of selecting the menu item.

The arrangement direction of the first menu item may be different from the arrangement direction of the second menu item.

Therefore, since the first menu item and the second menu item can be arranged in an L-shape, for example, the two types of menu items can be brought close. Thus, the user can recognize contents of both the menu items, without moving a look so much. Moreover, since the two types of menu items are brought close, the user's operability can be improved.

The display unit may be configured to display the application selection menu item at a position where the arrangement direction of the first menu item intersects with the arrangement direction of the second menu item.

Therefore, the display position of the application selection menu item and the display positions of the first and second menu items can be brought close. Thus, since all the menu items can be located at substantially one location, the user's operability can be more improved.

The display screen may be rectangular in shape, and wherein the display unit may be configured to display the application selection menu item on any one of an upper left corner, an upper right corner, a lower left corner, and a lower right corner of the display screen.

Therefore, since the display screen can be efficiently utilized, the information image created by the execution of the application can be displayed largely.

The display unit may change, when an active application is newly selected, the first menu item and the second menu item to another application proprietary menu item associated with the newly selected application.

Therefore, even if the application is switched to another application, a menu item associated with the new application can still be displayed in the same display manner.

The application proprietary menu item may be configured to be in a hierarchical manner, and the first menu item may be laid at a top layer of the hierarchy and the second menu item may be laid at another layer in the hierarchy, immediately lower than the first menu item.

Therefore, even if the application has many menu items, the user can easily find a desired menu item.

The display unit may be configured to display all the menu items of the top layer of the hierarchy serially in one direction, as the first menu item.

Therefore, a menu tree set to the application can be easily recognized by the user.

The display unit may be configured to serially display in one direction all the menu items which are laid at an immediately lower layer in the hierarchy than the first menu item, as the second menu item.

Therefore, the menu tree set to the application can be more easily recognized by the user.

The second menu item may display setting values of a corresponding menu item.

Therefore, the user can recognize contents of the settings only by viewing the second menu item.

The second menu item may be configured to be continuously displayed even after processing based on whether a selection of the second menu item by the user is executed.

Therefore, the user can select the second menu item, without again selecting the first menu item, when sequentially selecting the second menu item associated with the first menu item. Therefore, the user's time and effort can be reduced and operability can be improved.

When the second menu item is selected by the user, a third menu item may be displayed if there is any third menu item associated with the second menu item.

Therefore, this configuration can be applied to an application where menu items are provided in a multilayer form, or an application with many setting items, for example. Further, since the third menu item is displayed when the second menu item is selected, it can prevent the viewability of the information image from decreasing by the third menu item, such as by covering up the second menu item.

After the third menu item is selected or after a menu item associated with the third menu item is selected, the third menu item may be hidden.

Therefore, since it can prevent the display screen from being occupied by the third menu item, the viewability of the information image does not decrease.

The second menu item associated with the third menu item and the second menu item not associated with the third menu item may be displayed distinguishable from each other by the user.

Therefore, the user can recognize the existence of the third menu item only by viewing the second menu item.

The display unit may be configured to display a common menu item that is used in common between different applications, and the common menu item may be continuously displayed at substantially the same position even if the application is switched to another application.

Therefore, the user's operation can be more unified between the applications.

The user interface may include a plurality of user interface selectors, and the user interface selector may allow the user to select at least one of the first menu item and the second menu item.

Therefore, even if the first menu item is arranged apart from the second menu item, it can prevent that time to start the selection of the menu item and effort therefor increase.

At least one of the plurality of user interface selectors may allow the user to select only one of the first menu item and the second menu item.

Therefore, if a user interface selector which can select only the second menu item is provided, for example, the second menu item can be quickly selected after the selection of the first menu item.

The plurality of user interface selectors may allow the user to switch a selectable menu item to another menu item.

Therefore, since the selection of the menu item can be performed in various ways, the configuration can be flexibly applied to use environment and the user's preferences.

The device may be carried in a ship having a radar antenna. The application may include an application for displaying a target object around the ship as the information image based on a signal from the radar antenna, and an application for displaying a nautical chart around the ship as the information image.

Therefore, the above-described effects can be demonstrated also in this type of information display device which is carried in a ship. Especially for such a ship application, if the application has many menu items and when the menu item is selected, it is not preferred that the information image is hidden. Therefore, the effects of the present invention can be demonstrated effectively in such an application.

According to another aspect of the invention, a method of displaying information is provided. The method includes simultaneously displaying an application selection menu item for allowing a user to select one of applications and an application proprietary menu item that is used with a selected application, along with an information image created by execution of the selected application. The method also includes displaying the information image, the application selection menu item, and the application proprietary menu item at substantially the same position on a display screen, regardless of which application is selected.

Therefore, the user's operations can be unified between the applications.

BRIEF DESCRIPTION OF THE DRAWINGS

The present disclosure is illustrated by way of example and not by way of limitation in the figures of the accompanying drawings, in which like reference numerals indicate like elements and in which.

DETAILED DESCRIPTION

Figure 1:
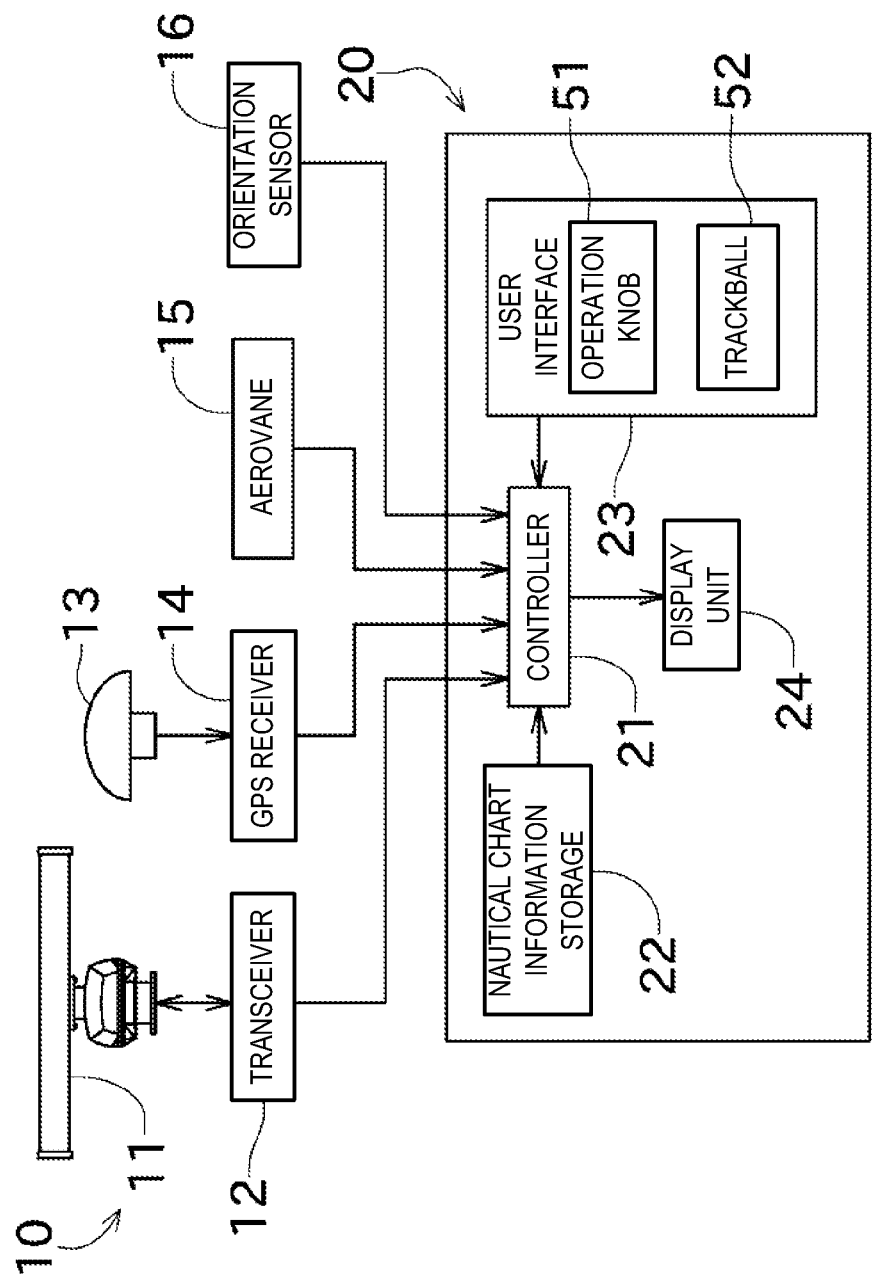
FIG. 1 is a block diagram showing a configuration of an information display device according to one embodiment of the present invention.
Figure 2:
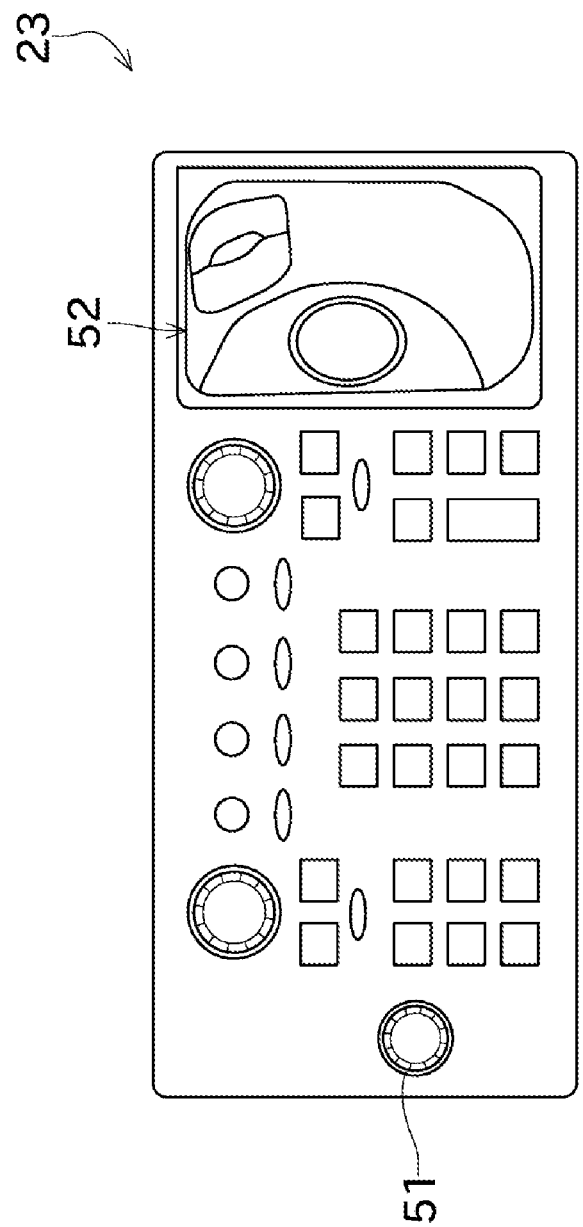
FIG. 2 is an elevational view showing a configuration of a user interface shown in FIG. 1.

Next, one embodiment of the present invention is described in detail with reference to the accompanying drawings. FIG. 1 is a block diagram showing a configuration of an information display device 20 according to this embodiment. FIG. 2 is an elevational view showing a configuration of a user interface 23 shown in FIG. 1.

As shown in FIG. 1, the information display device 20 includes a controller 21, a nautical chart information storage 22, a user interface 23, and a display unit 24. The information display device 20 is connected with various sensors, for example, which can detect positional information on a ship which equips this display device (hereinafter, simply referred to as "the ship"), and positional information on one or more target objects. Detection results of these sensors are inputted into the controller 21. The controller 21 creates a radar image and a nautical chart around the ship based on the detection results of the sensors, and causes the display unit 24, which has a rectangular display screen in this embodiment, to display the radar image and the nautical chart. Note that the shape of the display screen may also be square or other shapes suitable for the present invention.

A user operates the user interface 23 to switch display contents of the display unit 24 and change various settings of the display device. As shown in FIG. 2, the user interface 23 is a hardware component that includes user interface selectors such as an operation knob 51, a trackball 52, and various kinds of keys.

The operation knob 51 can be rotated or turned by the user to move a cursor onto a predetermined menu item, and the user can then push the operation knob 51 to select the menu item. The trackball 52 can allow the user to move a pointer to a predetermined menu item, and the user can then select the menu item by clicking the trackball. Each of these selection manners of the menu item can be carried out by a common operation even when the application is switched to another application, as described later in detail.

The information display device 20 is mainly connected with an antenna unit 10, a GPS receiver 14, an aerovane 15, and an orientation sensor 16.

The antenna unit 10 includes a radar antenna 11 and a transceiver 12. The radar antenna 11 transmits pulse-shaped radio waves (transmission pulse signals) with a high directivity, and receives echo signals (reflection waves) from one or more target objects.

The transceiver 12 samples the echo signals which the radar antenna 11 received and then outputs digitized echo signals to the controller 21.

The controller 21 is comprised of hardware (not illustrated) including a CPU, RAM, and ROM, and software including various kinds of computer programs stored in the ROM. The controller 21 executes one or more programs to control the information display device 20 (e.g., to control display of the display unit). The program(s) may be stored in the ROM provided to the controller 21, or may be stored in an external nonvolatile storage media (e.g., a CD-ROM) which is readable by the controller 21. The controller 21 calculates a distance to a source of the echo (i.e., a target object, such as another ship or land) based on a time length until the radar antenna 11 receives the echo signal. A direction of the radar antenna 11 when receiving the echo (i.e., a transceiving direction of the radio wave) indicates an azimuth where the echo source exists. Thus, the controller 21 can calculate a position of the echo source and then display the position on the display unit 24. The controller 21 can also perform setting of the radar antenna 11 and a radar image through operations of the user (e.g., setting of a pulse width of the transmission pulse signal, setting of whether or not interference removal processing is to be performed, etc.).

The GPS receiver 14 receives positioning signals through a GPS antenna 13 to detect a current position or positional information of the ship (in detail, a position of the GPS antenna 13). The positional information calculated by the GPS receiver 14 is then outputted to the controller 21.

The aerovane 15 may have a typical configuration where a vertical tail fin and a propeller are attached to a horizontally-rotatable main body. Thus, when the vertical tail fin receives wind, the main body turns on a horizontal plane so that the propeller points windward. Therefore, a wind direction can be detected based on the direction of the main body, and a wind speed can be detected based on a rotating speed of the propeller. The wind direction and the wind speed detected by the aerovane 15 are transmitted to the controller 21.

The orientation sensor 16 is provided with two or more GPS antennas fixed to the ship, and can detect a heading of the ship based on positioning signals and a relative spatial relationship of the GPS antennas. The ship's heading detected by the orientation sensor 16 is transmitted to the controller 21. Note that the orientation sensor 16 may also be a magnetic orientation sensor, a gyrocompass, etc.

The controller 21 displays the detection results of the sensors on the display unit 24 based on the data inputted from the aerovane 15, the orientation sensor 16, and other sensors (not illustrated). The controller 21 can change the data displayed on the display unit 24 and display positions of the data, according to the user's operation(s).

As described above, the information display device 20 includes the nautical chart information storage 22 which stores an electronic nautical chart. The controller 21 automatically displays the nautical chart around the ship on the display unit 24 based on the positional information on the ship inputted from the GPS receiver 14 and the memory content of the nautical chart information storage 22.

Moreover, the controller 21 has a route creating function, which creates a ship's route for arriving at a destination from a starting position based on information such as marks stored in advance, and displays the route on the display unit 24 together with the ship position.

As described above, the controller 21 is configured to execute the application for performing processing relating to the antenna unit 10 and the radar image, the application for displaying the data in a form set by the user, and the application for performing processing relating to the electronic nautical chart and the route. The controller 21 is configured to display on the display unit 24 the information image from an application which the user selected.

Figure 3A:
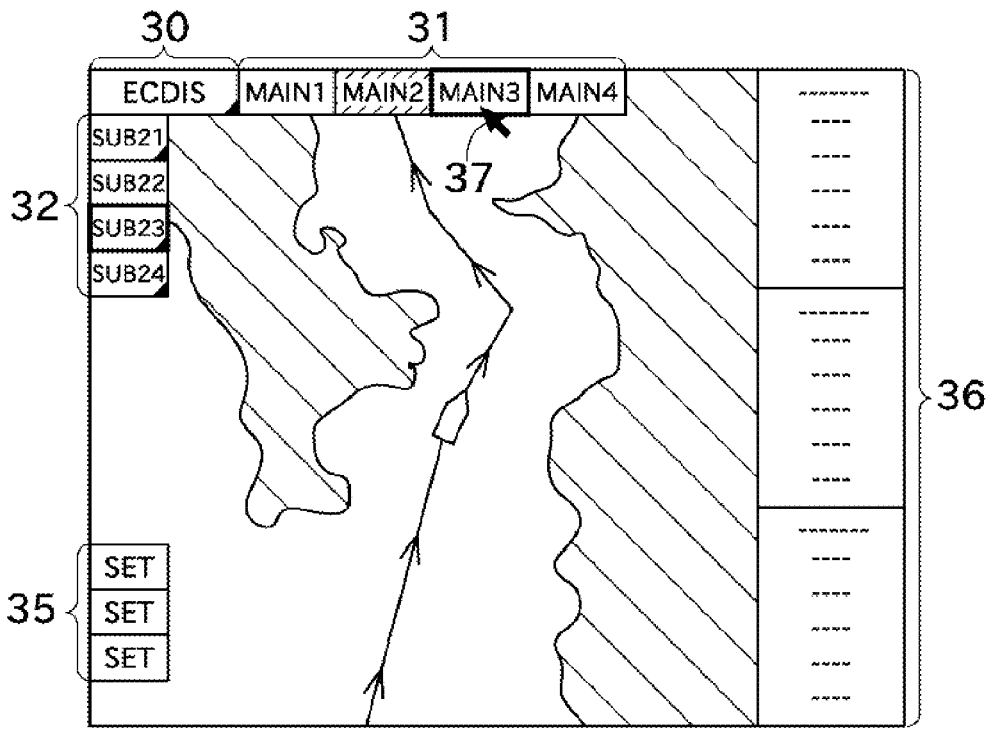
FIGS. 3A and 3B are views showing display contents of a display unit in case an active application is ECDIS.
Figure 3B:
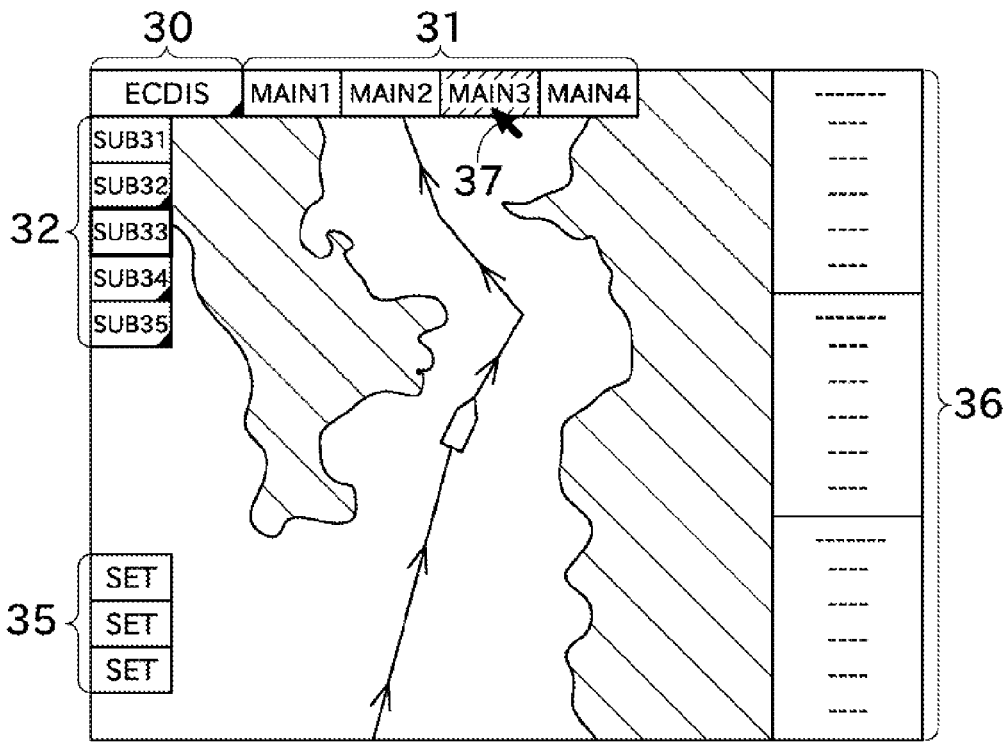
Figure 4A:
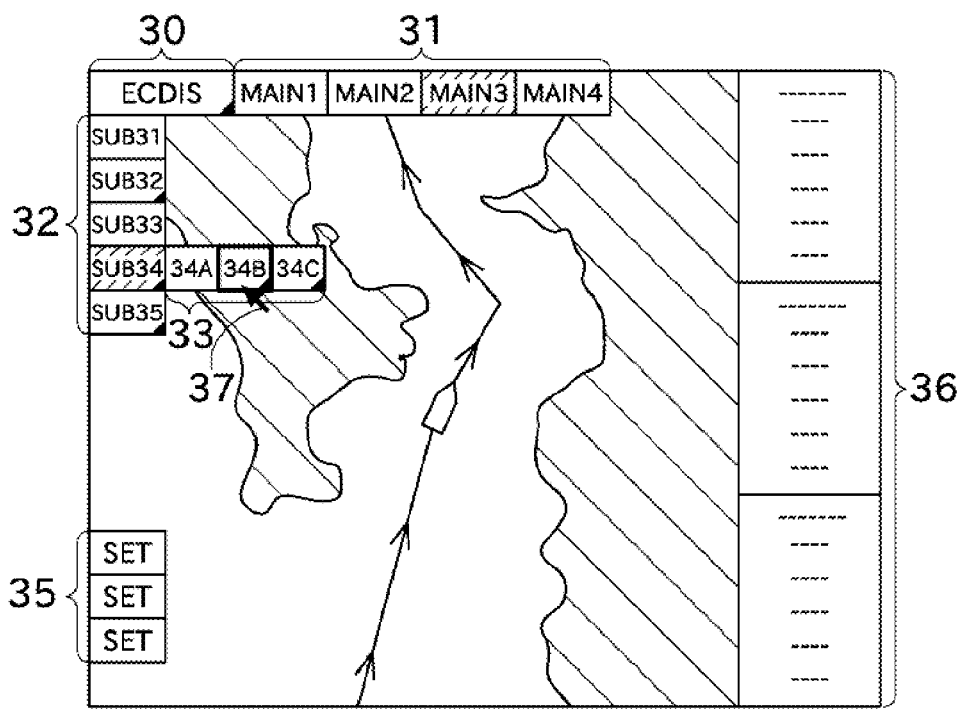
FIGS. 4A and 4B are views showing display contents of the display unit in case the active application is ECDIS.
Figure 4B:
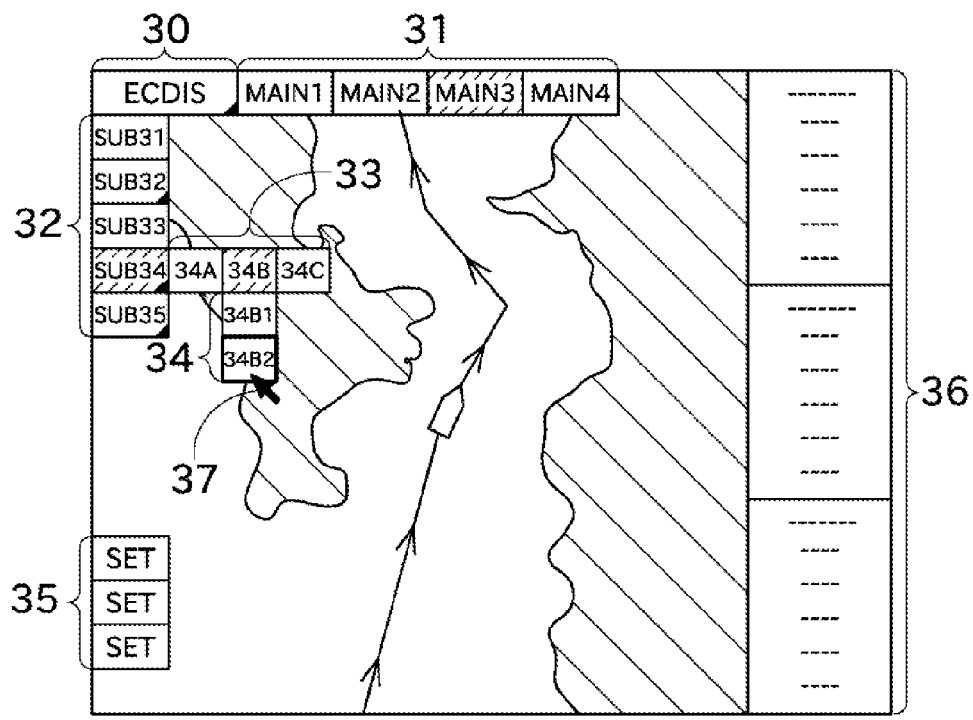
Figure 5A:
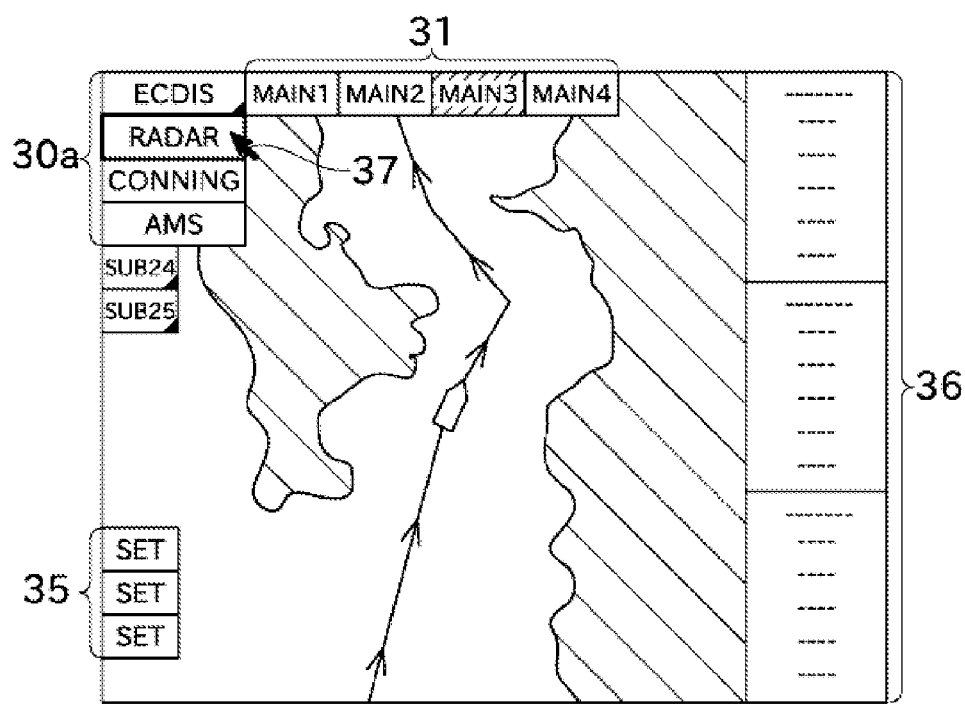
FIGS. 5A and 5B are views showing display contents of the display unit in case the application is switched from ECDIS to RADAR.
Figure 5B:
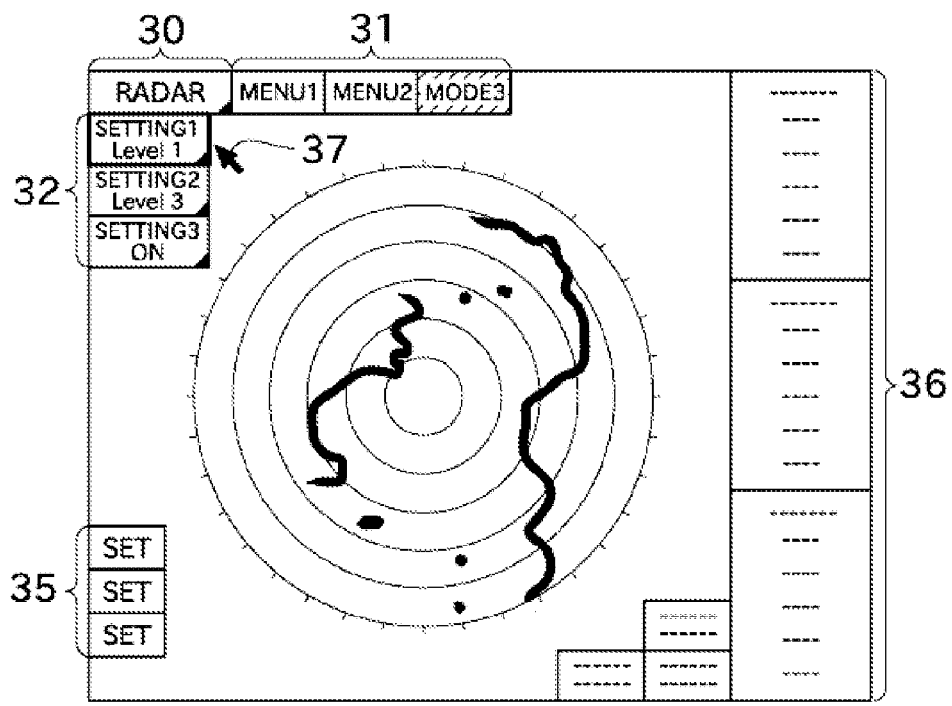

Next, referring to FIGS. 3A, 3B, 4A, 4B, 5A, 5B, 6A, 6B, 7A, and 7B, the contents displayed on the display unit 24 and an operation method thereof are described. FIGS. 3A and 3B, and 4A and 4B are views showing display contents of the display unit 24 in a case where an active application is ECDIS, which is the application for performing processing relating to the electronic nautical chart and the route. FIGS. 5A and 5B are views showing display contents of the display unit 24 in a case where the application is switched from ECDIS to RADAR, which is the application for performing processing relating to the antenna unit 10 and the radar image. FIGS. 6A and 6B, and 7A and 7B are views showing display contents of the display unit 24 in the case where the active application is RADAR. Note that the term "active application" as used herein refers to the application which is currently displayed.

As shown in FIG. 3A, the display content of the display unit 24 includes the electronic nautical chart or the radar image as an information image largely displayed in the middle of the display screen. The display content also includes an application display part 30, a first menu item display part 31, a second menu item display part 32, a common menu item display part 35, and a navigation data display part 36. As shown in FIGS. 4A and 4B, a third menu item display part 33 and/or a fourth menu item display part 34 may be temporarily displayed on the display unit 24.

First, the case when the active application is ECDIS is described in detail.

The application display part 30 is arranged in an upper left corner of the display screen. The application display part 30 shows which application is active. When switching the active application (e.g., when changing from ECDIS to RADAR), the user operates the trackball 52 to move the pointer 37, and then clicks on the application display part 30. Then, as shown in FIG. 5A, a list of applications is displayed below the application display part 30. The list and the application display part 30 constitute an application selection menu 30a. Then, the user moves the pointer 37 to "RADAR" which is an application the user wants to display in this example. At this time, as shown in FIG. 5A, a box-shaped cursor is displayed on "RADAR" where the pointer 37 is set. Then, by the user clicking in this state, the active application is switched from ECDIS to RADAR (see FIG. 5B). Note that the application display part 30 and the application selection menu 30a have a common display configuration regardless of which application is selected. Further, a selection manner of the application (a device used for the selection, a procedure of the selection, etc.) is common regardless of which application is selected.

The first menu item display part 31 is arranged in an elongated area along an edge of the display screen (e.g., an upper edge part of the display unit 24) from an upper left corner of the display screen (i.e., a screen corner where the name of the application is displayed). In the first menu item display part 31, first menu items are arranged in a line in the horizontal direction. The first menu items are menu items which are used with the application displayed on the application display part 30 (i.e., an active or selected application). In this embodiment, since an application with many menu items (ECDIS, RADAR, etc.) is used, the menu items are displayed in a hierarchical manner. The first menu item display part 31 displays all the menu items associated with a top layer of the hierarchy-type menu.

When selecting the first menu item, the user first operates the trackball 52 to move the pointer 37 to a desired first menu item. At this time, a box-shaped cursor is displayed on the first menu item where the pointer 37 is located (see FIG. 3A). Then, by clicking in this state, the first menu item can be selected. The selected first menu item differs in an indication color from other first menu items (e.g., the color is inverted) (see FIG. 3B). Note that in the figure the inverted color is indicated by hatching.

The second menu item display part 32 is arranged in an elongated area along an edge of the display screen (e.g., a left edge part of the display unit 24) from the upper left corner of the display screen (i.e., a screen corner where the name of the application is displayed). In the second menu item display part 32, the second menu items are arranged in a line in the vertical direction. Thus, the application selection menu 30a is displayed at a position where the arrangement direction of the first menu items and the arrangement direction of the second menu items intersect. In the second menu item display part 32, all the menu items in a layer of the hierarchy immediately lower than the first menu item which is selected as described above are arranged in the same line as the second menu items in the same direction. Thus, as shown in FIGS. 3A and 3B, the second menu item display part 32 displays different second menu items according to the selection of the first menu item. There are two patterns of the second menu items: one is a case where menu items (third menu items) also exist in a layer lower than the second menu item, and the other is a case where the lower layer does not exist in the second menu item. The second menu item is configured to distinguishably display which pattern the second menu item falls. In this embodiment, a triangle distinguishing mark is displayed, only on the second menu item where the lower-layer third menu items exist, at a lower right of the box, and therefore, the user can distinguish the existence of the third menu items.

When selecting the second menu item, the user moves the box-shaped cursor displayed on the second menu item display part 32 by rotating the operation knob 51, and then moves the cursor to a desired second menu item. The second menu item can be selected by pushing the operation knob 51 in this state. The user can cause the controller 21 to perform the selected work and settings by selecting the second menu item where the distinguishing mark is not displayed. On the other hand, the user can display the third menu item display part 33 by selecting the second menu item where the distinguishing mark is displayed (see FIG. 4A).

Normally, the second menu item display part 32 is always displayed. Therefore, for example, if there is a first menu item used frequently, the user can select the lower-layer second menu item, without selecting the first menu item each time. Note that the second menu item display part 32 may also be hidden according to the user's operation through the user interface 23.

The third menu item display part 33 is not usually displayed in order to prevent it from overlapping with the electronic nautical chart. Therefore, only when the second menu item where the distinguishing mark is displayed is selected, as shown in FIG. 4A, the third menu item display part 33 is displayed in the elongated area extending to the right from the second menu item display part 32. In the third menu item display part 33, the third menu items which locate in the layer lower than the selected second menu item are arranged in the horizontal direction (i.e., in the same direction as the first menu items). A distinguishing mark is displayed at a lower right corner of the box of the third menu item, similar to the second menu item, only when menu items exist in a layer lower than the third menu item (fourth menu items). Note that a selection of the third menu item display part 33 can be performed using the trackball 52 similar to the first menu item.

The user can cause the controller 21 to perform the selected work and settings by selecting the third menu item where the distinguishing mark is not displayed. On the other hand, the user can display the fourth menu item display part 34 by selecting the third menu item where the distinguishing mark is displayed (see FIG. 4B). After the selection of the third menu item or the selection of the fourth menu item associated with the third menu item is performed, the third menu item will be hidden (i.e., will not be displayed).

In the fourth menu item display part 34, the fourth menu items associated with the selected third menu item are arranged in the vertical direction (i.e., in the same direction as the second menu items). Note that a selection of the fourth menu item display part 34 can be performed using the trackball 52 similar to the first menu item.

In this embodiment, the arrangement of the menu items is kept same regardless of which application is active or selected, while the contents of the menu items are changed according to the active application. Therefore, the user's operations can be unified between applications. As shown in FIG. 5A, the display unit 24 can simultaneously display the information image (e.g., the electronic nautical chart) created by the execution of the selected application, the application selection menu 30a, and the menu items used with the selected application (the first to fourth menu items).

In this embodiment, the menu items are selected as described above, and the operation knob 51 is used only for the selection of the second menu item and the trackball 52 is used for other selections. Thus, since it is not necessary to move the pointer 37 greatly after the selection of the first menu item, the second menu item can be selected quickly. Note that arbitrary settings are possible for the selection manner of the menu item. For example, settings which can select a menu item other than the second menu item using the operation knob 51, or settings which can select the second menu item using the trackball 52 may also be applied.

As for the user interface selector, for example, an external mouse may also be used instead of the trackball 52. A configuration provided with direction keys and an ENTER key may also be used as the user interface selector.

The common menu item display part 35 is arranged below the second menu item in the display screen. In the common menu item display part 35, the common menu items which are used in common between different applications are displayed. The common menu item display part 35 is configured to be displayed at the same position even when the application is switched (see FIGS. 5A and 5B). Therefore, the user's operations between the applications can be unified.

Processing performed by the common menu item may include processing which cancels an operation and resumes an original state (i.e., UNDO), and processing which adjusts indication colors of the display screen, for example.

The navigation data display part 36 displays information according to the application (e.g., settings information related to the route if ECDIS), and information always displayed regardless of which application is selected (a speed, a position, a heading of the ship, etc.).

Next, a particular example of the menu items in case the active application is ECDIS is described briefly. In ECDIS, "route surveillance," "route plan," and "nautical chart management" are set as the first menu items, for example. "Route surveillance" is a menu item for performing settings relating to an indication of route settings. "Route plan" is a menu item for setting the route. "Nautical chart management" is a menu item for performing an installation or an update of data of the electronic nautical chart.

The second menu item associated with "route surveillance" may include "display settings," for example. Further, the third menu item associated with "display settings" may include "divided indication" and "object settings," for example. "Divided indication" is a menu item for displaying two or more nautical charts with different positions and scales on the display unit 24. "Object settings" is a menu item for setting the information displayed on the electronic nautical chart.

The fourth menu items associated with "object settings" may be "select display object" and "mark settings," for example. "Select display object" is a menu item for selecting an object to be displayed on the nautical chart (the mark which the user sets, a buoy, etc.). "Mark settings" is a menu item for setting a shape of the mark to display.

Next, a configuration of the display unit 24 after the application is switched from ECDIS to RADAR is described in detail. In this embodiment, when the active application is switched, the first menu item and the second menu item are switched to the menu items associated with the newly selected application (see FIGS. 5A and 5B). As shown in FIGS. 5A and 5B, even when the application is switched from ECDIS to RADAR, the first menu item display part 31 is still arranged along the upper edge of the display screen, while the second menu item display part 32 is also still arranged along the left edge of the display screen. Note that the number of menu items displayed in the first menu item display part 31 and the size of the menu item displayed in the second menu item display part 32 may varies, though the variations may be small. Herein, "the display position of the menu item is substantially common" includes such a case where there is a minute change between applications.

Whereas, when the active application is switched to RADAR, the display contents of the common menu item display part 35 do not change as described above. On the other hand, the display contents of the navigation data display part 36 change in part so that information according to the application (e.g., information relating to a target tracking in the case of RADAR) is displayed. As the first menu item, the menu items for performing settings relating to the antenna unit 10 and the radar image are displayed. Specifically, the first menu item may include a menu item for instructing a start of transmission of pulse signals, a menu item for selecting the antenna to be used if a plurality of radar antennas are provided, and a menu item for switching a display mode of the radar image.

Hereinafter, the display mode of the radar image is described in detail. Although various setting items exist for the radar, these settings can be carried out in batch processing by setting a display mode. In this embodiment, the display mode includes a short-distance mode, a long-distance mode, a seashore mode, and a user setting mode (i.e., a display mode to which desired settings are done by the user), for example (in the figure, they are denoted as MODE1, MODE2, . . . ).

Figure 6A:
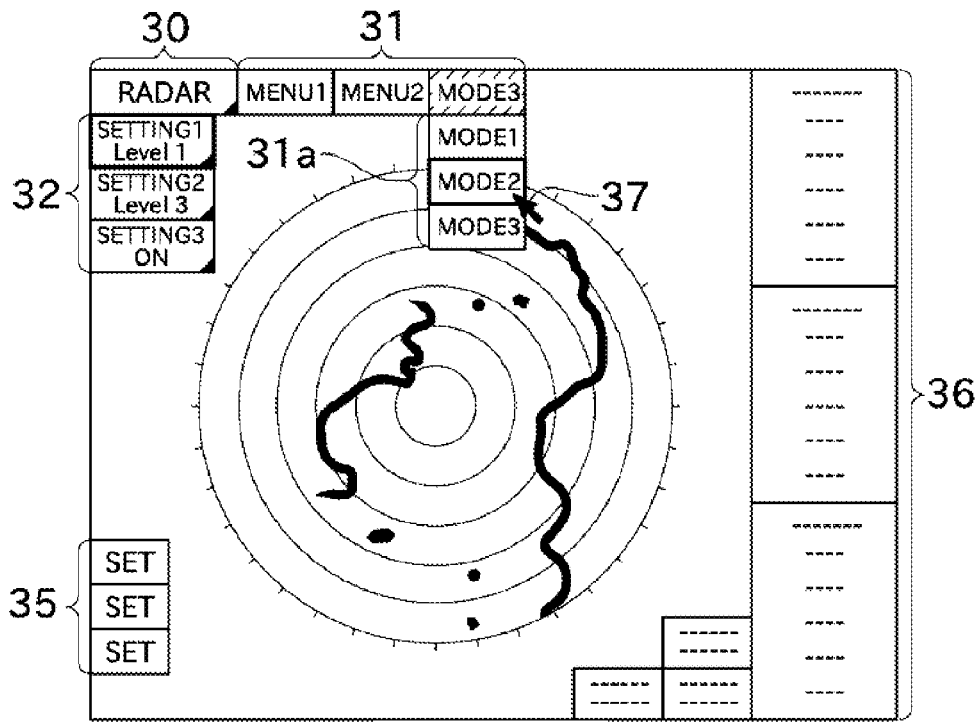
FIGS. 6A and 6B are views showing display contents of the display unit in case the active application is RADAR.
Figure 6B:
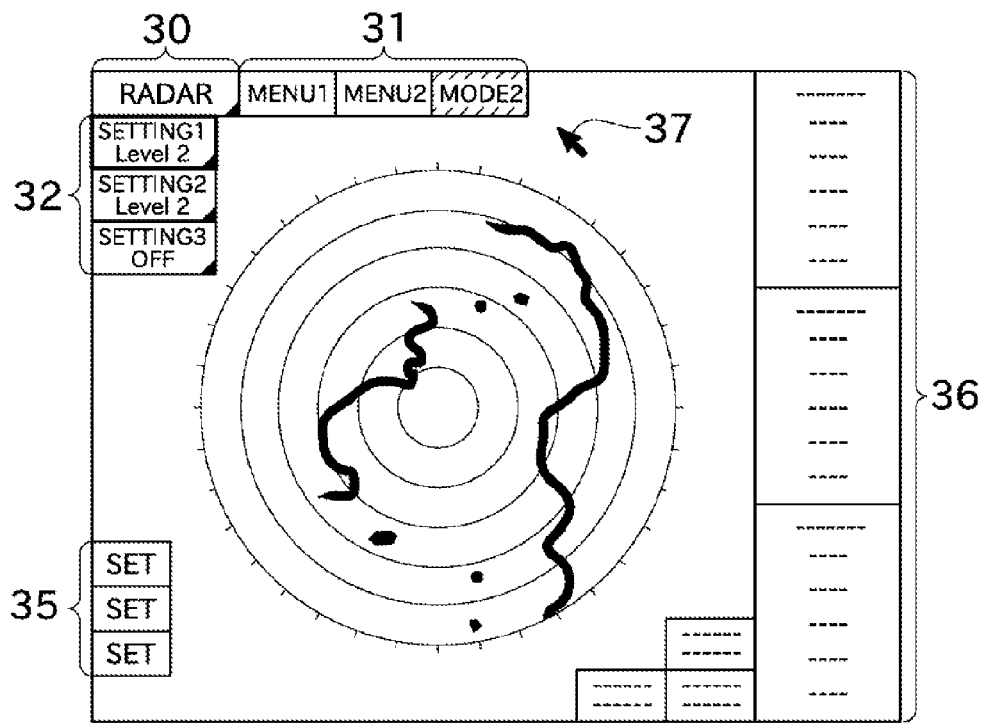
Figure 7A:
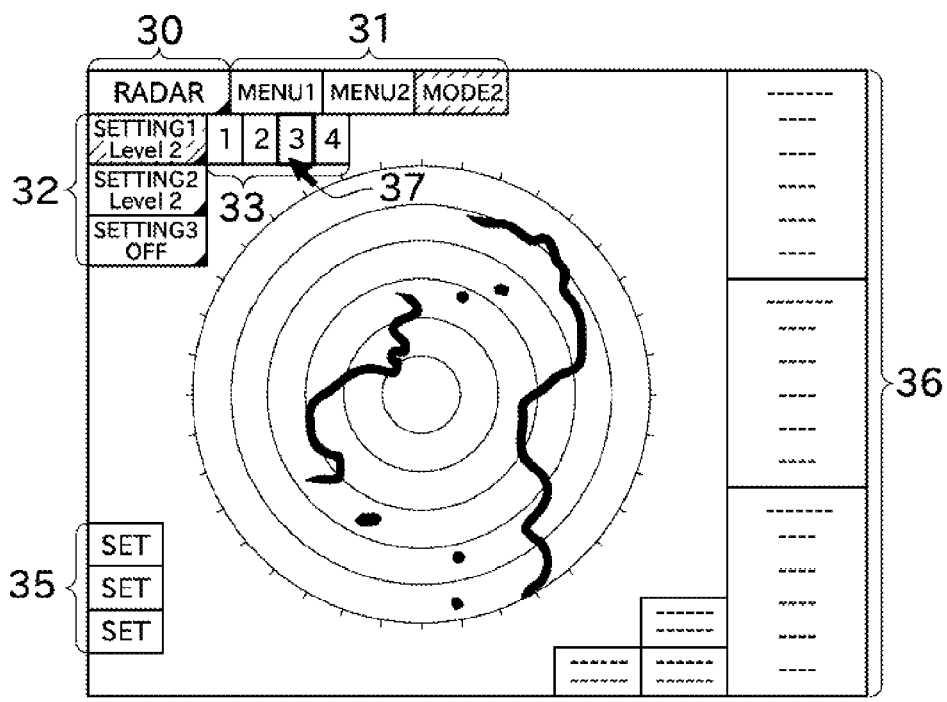
FIGS. 7A and 7B are views showing display contents of the display unit in case the active application is RADAR.
Figure 7B:
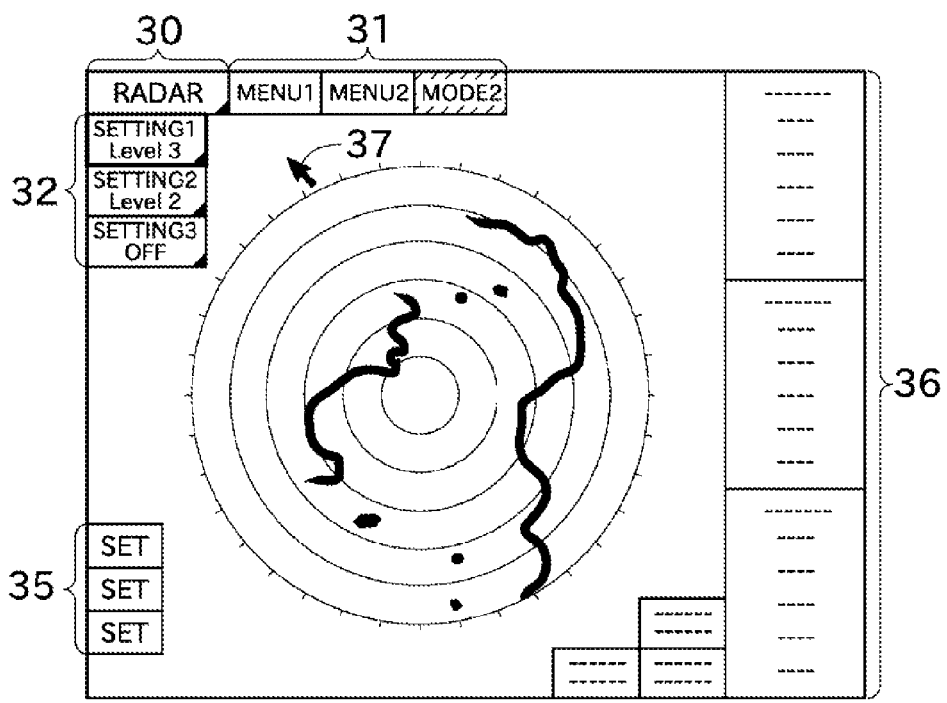

As shown in FIG. 5B, the first menu item display part 31 displays a display mode which is currently set or selected. When the user wishes to switch the display mode, the user operates the trackball 52 and then clicks on the display mode of the first menu item display part 31. Then, as shown in FIG. 6A, a list of the display modes (the display mode selection menu 31a) will be displayed. Then, the user can change the display mode by clicking on another desired display mode. Note that FIGS. 6A and 6B show a state when switching the display mode from MODE3 to MODE2.

On the other hand, the second menu item display part 32 displays the setting items relating to the radar as the second menu items. The second menu items are configured to display, not only the contents of the setting items, but also the current settings (which level is selected or which function is ON/OFF). The second menu item may also include settings of the pulse width, gain settings, synchronizing settings, etc.

The settings of the second menu items can be changed collectively or in batch processing by selecting the display mode as described above (see FIG. 6A). For example, when the short-distance mode is selected, all the settings are simultaneously changed so that a target object at a short distance becomes easy to view.

After switching the display mode, the user can change a level of the setting items and adjust the radar image (see FIGS. 7A and 7B), by a similar operation to the selection of the third menu item in a case where the active application is ECDIS. Particularly, in this embodiment, since the second menu item continues being displayed while the current settings are displayed in the second menu items, such an adjustment can be performed easily.

Thus, the selection of the menu item is performed through a similar procedure (i.e., a similar selection manner) to the case where the active application is ECDIS, by using the operation knob 51 and the trackball 52. Note that, when the active application is RADAR, unlike the case of ECDIS, it is necessary to perform the selection from the display mode selection menu 31a of a pull-down type when selecting the first menu item. Herein, "the selection manners of the menu item are substantially common" also includes a case where the selection manners differ slightly between the applications.

As described above, the information display device 20 displays the information image created by the execution of the selected application and the name of the selected application in the upper left corner of the display screen. The first menu items are displayed in the horizontal direction along an edge of the display screen from the position where the application name is displayed. The information display device 20 displays the second menu items associated with the first menu item, in the vertical direction along an edge of the display screen from the position where the application name is displayed. The information display device 20 displays the menu item associated with the newly selected application when the active application is switched. Note that display processing of the display unit 24 is performed by executing a computer executable program stored in the ROM of the controller 21, as described above.

Therefore, the user's operations can be unified between the applications. Thus, the user can easily find out a desired menu item even if the application has many menu items (e.g., like the case of ECDIS).

In the information display device 20, the second menu items continue being displayed also after processing is performed based on the selection of the second menu item. Therefore, the second menu item can be selected with an easy operation when sequentially selecting two or more second menu items associated with the first menu item.

Further, since the information display device 20 displays the distinguishing mark for identifying the second menu item associated with the third menu item, the user can recognize the existence of the third menu items only by viewing the second menu item. Further, since the third menu items are displayed only when the second menu item is selected, it can prevent the viewability of the display screen from becoming degraded by the third menu items (e.g., overlapped with the third menu item).

The information display device 20 includes the user interface selector (i.e., the operation knob 51 and the trackball 52). The user interface selector can select at least one of the first menu item and the second menu item. Therefore, even if it has such a configuration where the position of the first menu item and the position of the second menu item tend to be separate from each other, it can prevent time to start a selection of the menu item and an effort therefor from increasing.

Although a suitable embodiment of the present invention is described above, such a configuration of the embodiment may also be modified or changed as follows.

The display screen described in the above embodiment is merely an example, and the information image, the application selection menu, and the menu item that is used with the selected application are to be suitably displayed at the substantially same position regardless of which application is selected or active.

The application selection menus 30a (of the application display part 30) may be displayed on an upper right corner, a lower left corner, or a lower right corner of the display screen, other than on the upper left corner.

Contrary to the configuration of the above embodiment, the first menu item may be arranged in a line in the vertical direction along an edge of the display screen from the position where the menu for allowing the user to select one of the applications is displayed (e.g., the upper left corner of the display screen), whereas the second menu item may be arranged in a line in the horizontal direction along an edge of the display screen from the position where the menu for allowing the user to select one of the applications is displayed (e.g., the upper left corner of the display screen). Alternatively, the first menu item and the second menu item may be arranged in parallel to each other. Specifically, the first menu items may be arranged along an upper edge of the display screen, while the second menu items may be arranged along a lower edge of the display screen, or the first menu items may be arranged along a left edge of the display screen, while the second menu items may be arranged along a right edge of the display screen. Alternatively, the first menu items are arranged in a part of the upper edge (e.g., left-hand side) of the display screen, while the second menu items are arranged next to the first menu items (i.e., right-hand side of the upper edge of the display screen).

Sensors to be connected to the display unit are not limited to the sensors in the above embodiment, the display unit may also be connected with a sonar, a fish finder, etc. The application executable by the controller 21 is not limited to the application described in the above embodiment, but the controller 21 may be able to execute an application which displays school-of-fish information based on data acquired from the fish finder, for example.

The information display device is not limited to the application to a ship; but the information display device may be carried in other movable bodies, such as an automobile or an airplane, and may have a configuration which displays information images of applications used by the movable body (e.g., navigation software). Alternatively, the information display device may be applicable to a store management system which performs management of both sales and personnel by selectively using a plurality of applications, or a system which performs editing of an image and sound by selectively using a plurality of applications, for example.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. An information display device installed in a ship, comprising:

a controller including hardware configured to execute a plurality of software applications including an application for displaying an image of a target object around the ship as the information image based on a signal from a radar antenna, and an application for displaying a nautical chart of a region around the ship as the information image;
a user interface including a hardware component configured to receive a user instruction for the controller; and
a display unit for simultaneously displaying an application selection menu item for allowing a user to select one of the applications an application proprietary menu item that is used during execution of a selected application, along with an information image created by execution of the selected application, and navigation information including at least one of a speed, a position, and a heading of the ship,
wherein the display unit is configured to display the information image, the application selection menu item, the application proprietary menu item, and navigation information at substantially the same respective positions on a display screen of the display unit over information of the application for displaying the image of the target object around the ship as the information image based on a signal from the radar antenna when the application for displaying the target object is displayed, and over information of the application for displaying the nautical chart of the region around the ship as the information image, when the application for displaying the nautical chart the nautical chart is displayed.

2. The information display device of claim 1, wherein a selection manner of the application selection menu item and a selection manner of the application proprietary menu item are configured to be substantially the same, regardless of which application is selected.

3. The information display device of claim 1, wherein the display unit is configured to display a common menu item that is used in common between different applications, and the common menu item is continuously displayed at substantially the same position even if the application is switched to another application.

4. The information display device of claim 1, wherein the application proprietary menu item includes:
a first menu item configured to be displayed along an edge of the display screen, and arranged at least one of vertically and horizontally; and
a second menu item associated with the first menu item, displayed along an edge of the display screen, and arranged at least one of vertically and horizontally.

5. The information display device of claim 4, wherein an arrangement direction of the first menu item is different from an arrangement direction of the second menu item.

6. The information display device of claim 5, wherein the display unit is configured to display the application selection menu item at a position where the arrangement direction of the first menu item intersects with the arrangement direction of the second menu item.

7. The information display device of claim 4, wherein the display screen is rectangular in shape, and wherein the display unit is configured to display the application selection menu item on any one of an upper left corner, an upper right corner, a lower left corner, and a lower right corner of the display screen.

8. The information display device of claim 4, wherein the display unit changes, when an active application is newly selected, the first menu item and the second menu item to another application proprietary menu item associated with the newly selected application.

9. The information display device of claim 4, wherein the application proprietary menu item is configured to be in a hierarchical manner, and the first menu item is laid at a top layer of the hierarchy and the second menu item is laid at another layer in the hierarchy, immediately lower than the first menu item.

10. The information display device of claim 9, wherein the display unit is configured to display all the menu items of the top layer of the hierarchy serially in one direction, as the first menu item.

11. The information display device of claim 10, wherein the display unit is configured to serially display in one direction all the menu items which are laid at an immediately lower layer in the hierarchy than the first menu item, as the second menu item.

12. The information display device of claim 4, wherein the second menu item displays setting values of a corresponding menu item.

13. The information display device of claim 4, wherein the second menu item is configured to be continuously displayed even after processing based on a selection of the second menu item by the user is executed.

14. The information display device of claim 4, wherein when the second menu item is selected by the user, a third menu item is displayed if there is any third menu item associated with the second menu item.

15. The information display device of claim 4, wherein the display unit is configured to display a common menu item that is used in common between different applications, and the common menu item is continuously displayed at substantially the same position even if the application is switched to another application.

16. The information display device of claim 4, wherein the user interface includes a plurality of user interface selectors, and the user interface selector allows the user to select at least one of the first menu item and the second menu item.

17. The information display device of claim 16, wherein at least one of the plurality of user interface selectors allows the user to select only one of the first menu item and the second menu item.

18. The information display device of claim 17, wherein the plurality of user interface selectors allow the user to switch a selectable menu item to another menu item.

19. A method of displaying information on an information display device installed in a ship, comprising:
simultaneously displaying an application selection menu item for allowing a user to select one of a plurality of applications and an application proprietary menu item that is used during execution of a selected application, along with an information image created by execution of the selected application and navigation information including at least one of a speed, a position, and a heading of the ship, wherein the plurality of applications includes an application for displaying an image of a target object around the ship as the information image based on a signal from a radar antenna, and an application for displaying a nautical chart of a region around the ship as the information image; and
displaying the information image, the application selection menu item, the application proprietary menu item, and navigation information at substantially the same respective positions on a display screen over information of the application for displaying the image of the target object around the ship as the information image based on a signal from the radar antenna when the application for displaying the target object is displayed, and over information of the application for displaying the nautical chart of the region around the ship as the information image, when the application for displaying the nautical chart the nautical chart is displayed.

* * * * *